Dec. 25, 1951     J. F. WILHELM     2,580,057
FLOAT GAUGE
Filed Jan. 23, 1947

INVENTOR.
Joseph F. Wilhelm
BY
Donald H. Sweet Atty.

Patented Dec. 25, 1951

2,580,057

UNITED STATES PATENT OFFICE 2,580,057

FLOAT GAUGE

Joseph F. Wilhelm, Green Bay, Wis.

Application January 23, 1947, Serial No. 723,844

4 Claims. (Cl. 73—317)

My invention relates to tank gauges and includes among its objects and advantages freedom from accidental breakage and reduction of deterioration with the passage of time in the type of gauge commonly used to indicate the level of the fuel in liquid fuel tanks for domestic heating plants.

Figure 2:
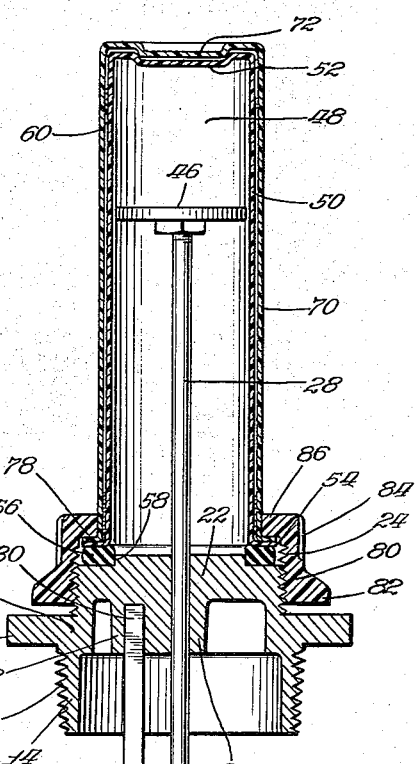
Figure 2 is a central vertical section of the gauge of Figure 1, with a float and associated parts in elevation.

In the embodiment of the invention selected for illustration, the tank 10 has a conventional threaded opening receiving the tapered pipe threads 12 of a lower sleeve 14 which is integral with a plug body 16. Above the threads 12 lies a flange 18, the outer edge of which has a hexagonal form with faces 20 suitable to be gripped by a wrench. The upper portion 22 of the plug 16 is elevated with respect to the flange 18 and its outer periphery carries pipe threads 24 of uniform diameter. A central boss 26 projects downward from the portion 22. An axial aperture through the plug 16 constitutes a guide-bearing for an indicator rod 28. The boss 26 is enlarged at one side, as clearly indicated at 28 in Figure 2 and is die-cast with a square bore into which is forced the upper square end 30 of a stationary support-rod 32. The indicator rod 28 terminates a short distance below the plug and at its lower end has pivotal connection with a link 34. A supporting arm 36 carries the float 38 at its outer end, which float may be secured against dislodgement by simply bending the outer end 40 of the arm 36 over at right angles and bending an offset 41 adjacent the inner end of the float. The bifurcated end 35 of the arm 36 has a pivot at 42 connecting it to the lower end of the support rod 32, and a pivotal connection at 44 actuates the link 34 to raise and lower the rod 28 as the float 38 rises and falls. At the upper end of the rod 28 is mounted the horizontal indicator disc 46 which may advantageously be of some bright color, as red, so that the gauge may be easily read.

The parts so far described correspond in function to the corresponding parts of my earlier Patent 2,316,377, issued April 13, 1943. To complete the operative gauge structure it is necessary to house the disc 46 and the portion of the rod 28 projecting above the plug 16 in a transparent housing so that the disc can be seen and this housing must be able to withstand any pressure to which the tank itself may be subjected. In my prior patent this was accomplished with an inner sleeve of glass terminating at the top in a closed dome, and an outer sleeve of transparent plastic, with an annular nut having a clamping ring of metal, the outer sleeve having a flange at the bottom adapted to be clamped against a gasket by the clamping ring. Such a construction is satisfactory in service but the glass part of the structure is expensive and somewhat difficult to assemble. It is also subject to accidental breakage during assembly and installation.

Figure 1:
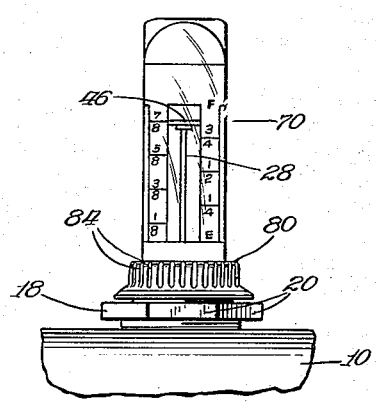
Figure 1 is a side elevation of a gauge mounted on a fuel tank.
Figure 4:
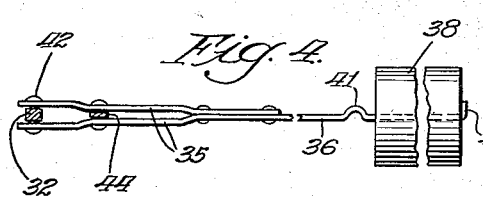
Figure 4 is a section on line 4—4 of Figure 2.
Figure 3:
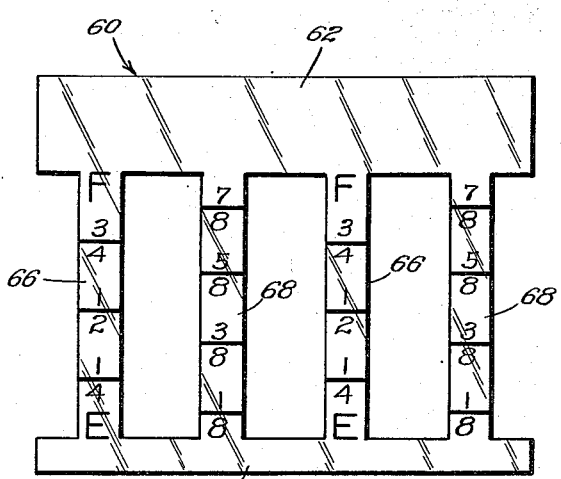
Figure 3 is a diagram of a paper insert bearing the scale markings of the gauge.

Referring again to the drawings, the chamber 48, housing the disc 46, is defined first by a plastic member having a tubular portion 50, an integral top 52, and a bottom lip or flange 54 flared outwardly into a horizontal plane. The enclosure is completed by the neoprene gasket 56 and the upper surface of the upper portion 22 of the plug, which is shouldered at 58 to define an upwardly and outwardly facing rabbet, snugly fitting the gasket 56. Outside the tubular portion 50 is a paper scale card 60, shown flat in Figure 3, which comprises a wide upper band 62 and a narrow lower band 64 interconnected by four uniformly spaced risers. Risers 66 are diametrically opposite each other in the assembled gauge and carry, at appropriate heights, the indicia E (for "Empty"), ¼, ½, ¾ and F (for "Full"). Risers 68 carry similar indicia at appropriate levels ⅛, ⅜, ⅝ and ⅞. The width of each riser is enough less than the diameter of the disc 46 to leave windows of substantial width through which the position of the disc 46 may be observed. It will be apparent that there is no position from which it is possible to look at the device without being able to see the disc and at least one of the risers clearly, and in almost all positions two adjacent risers and the indicia on both of them can be clearly seen.

The bands 62 and 64 are long enough to encircle the tubular portion 50 substantially completely but without overlap, so that there is nowhere more than one thickness of paper between the inner tube 50 and the outer tube 70 which is positioned therearound. This outer tube 70 is of a diameter to slide down easily over the inner tube 50 and scale 60 but without appreciable clearance or looseness. The upper end of the tube 70 has a top 72. The top of each tube is stiffened by an annular offset defining a central depressed portion, and the parts are proportioned so that when the device is completely assembled the top 72 bears firmly against the top 52.

At its bottom, the tube 70 carries an outwardly flared lip or flange 78, sufficiently narrower than the lip 54 to have substantially the same outside diameter. The annular assembly nut 80 is not of metal but of high strength plastic. It is internally threaded to fit the threads 24 on the plug 16 and reinforced at its lower edge by an outwardly directed flange 82. This flange is externally smooth and circular and in assembled position lies so close to the flange 18 that a workman or householder assembling the gauge is not likely to use a wrench on the flange 82. The manual tightening of nut 80 is additionally facilitated by providing the main portion of its barrel with a series of ribs 84 of a size and shape to adapt the barrel for convenient gripping with the fingers to draw an upper inwardly extending flange 86 down tightly on top of the lip 78, compressing the lip 78 and the lip 54 and the washer or gasket 56 tightly, so that an effective airtight seal is formed. For this purpose the nut is designed to provide substantial radial clearance outside the gasket 56, and the gasket 56 is formed with an undistorted inside diameter slightly smaller than the shoulder 58 so that it is stretched a little when it is slipped into place on the plug. The gasket 56, when undistorted, has a thickness slightly greater than the height of the rabbet, so that it protrudes above the surface of the plug 16. The inner diameter of the lip 54 is somewhat larger than that of the gasket 56, so that when the latter is so compressed it bulges both inwardly and upwardly, thus making an extremely tight seal between all interfaces.

It has been found that with parts of the proportions indicated in the drawings it is well within the ordinary strength of a workman's hand to tighten the nut 80 tight enough to secure a permanent air-tight seal and at the same time it is difficult to tighten it by hand far enough to distort the gasket or the lips 54 or 78 to such a degree that the stresses are excessive and gradual deterioration of the parts would result. With the construction of my former patent, where the annular clamping nut was to be tightened with a wrench, there was material risk that persons not familiar with such devices would tighten the nut down so far as to rupture the plastic tube and spoil the entire assembly. In the present invention, the use of a wrench, with resultant possibility of damage, is further discouraged by the use of a plastic, rather than a metal, nut. Because the grooves between the ribs 84 have open upper ends, the upper ends of the ribs are of a shape to imbed themselves effectively in the hand by which they are grasped, and secure the maximum gripping consistent with the strength of the operator.

It will be seen that the gauge illustrated in the drawing and described above presents considerable advantage in addition to preventing accidental damage as above pointed out. In the present construction, the annulus containing the indicator card is completely protected from the pressures present in the tank. In addition, there is no possibility of relative motion between the inner and outer walls of the annulus. Thus, the possibility of dislocation of the indicator within the annulus, and consequent error in calibration, due to pressure changes within the tank, is eliminated. Also, the indicator card cannot be exposed to the fumes present in the tank, which may cause slow deterioration, for example by discoloration of the indicator card or the scale markings thereon.

It will also be apparent that in the prior construction, scratching or abrasion of the outer tube sufficient to develop a pin hole leak would subject the contents of the tank to continuous leakage, because there was no effective seal inside the inner tube. In the present construction, the pneumatic seal is complete within the inner tube, and accidental abrasion of the outer tube would cause no such damage.

Others may readily adapt the invention for use under various conidtions of service by employing one or more of the novel features disclosed or with equivalents thereof. It will, for instance, be obvious that the gauge might equally well be mounted with the indicator rod 28 horizontal. As at present advised, with respect to the apparent scope of my invention, I desire to claim the following subject matter.

I claim:

1. In a tank gauge, in combination: a pipe-threaded plug having a polygonal flange for engagement with a wrench; said plug having an axially apertured central portion; said central portion presenting an exterior outwardly facing flat annular surface; and a cylindrical surface rising from the inner edge of said flat surface; a rubber-like gasket seated in the rabbet defined by said surfaces; an inner inverted plastic cup having an outwardly directed flange at its lower end shaped to rest on said gasket; the inside diameter of said flange being greater than the diameter of said cylindrical surface and less than the mean diameter of said gasket; said gasket extending above the upper end of said cylindrical surface; an outer inverted plastic cup telescoped over said inner cup; said outer cup having an outwardly directed flange overlying the flange of said inner cup; a plastic clamping nut having an inwardly extending flange overlying both said outwardly directed flanges; said central portion and nut having interengaging screw threads for tightening said nut; the closed upper ends of both cups having annular corrugations to increase the stiffness and mechanical strength of said ends; the bottom of said outer cup when assembled, lying close enough to the closed end of said inner cup to provide annular contact for mechanical reinforcement when said inner cup is subjected to internal pressure, before the deformation of said inner cup weakens the bottom thereof; whereby tightening of said nut distorts said gasket body downwardly and inwardly to secure a complete seal with a single gasket; and whereby said inner cup constitutes a complete barrier against internal pressure.

2. In a tank gauge, in combination: a pipe-threaded plug having a polygonal flange for engagement with a wrench; said plug having an axially apertured central portion; said central portion presenting an exterior outwardly facing flat annular surface; and a cylindrical surface rising from the inner edge of said flat surface; a rubber-like gasket seated in the rabbet defined by said surfaces; an inverted plastic cup having an outwardly directed flange at its lower end shaped to rest on said gasket; the inside diameter of said flange being greater than the diameter of said cylindrical surface and less than the mean diameter of said gasket; said gasket extending above the upper end of said cylindrical surface; whereby tightening of said nut distorts said gasket body downwardly and inwardly to secure a complete seal with a single gasket.

3. In a tank gauge, in combination: a pipe-threaded plug having a polygonal flange for engagement with a wrench; said plug having an axially apertured central portion; said central portion presenting an exterior outwardly facing flat annular surface; and a cylindrical surface rising from the inner edge of said flat surface; a rubber-like gasket seated in the rabbet defined by said surfaces; an inner inverted plastic cup having an outwardly directed flange at its lower end shaped to rest on said gasket; the inside diameter of said flange being greater than the diameter of said cylindrical surface and less than the mean diameter of said gasket; an outer inverted plastic cup telescoped over said inner cup; said outer cup having an outwardly directed flange overlying the flange of said inner cup; a clamping nut having an inwardly extending flange overlying both said outwardly directed flanges; said central portion and nut having interengaging screw threads for tightening said nut; the closed upper end of said outer cup lying close enough to the closed end of said inner cup to provide mechanical reinforcement when said inner cup is subjected to internal pressure, before the deformation of said inner cup weakens the closed end thereof.

4. A combination according to claim 3 in which said nut is of plastic and lies close above said polygonal flange; said nut being of smaller diameter than said flange and of a shape gripped conveniently by hand and relatively inconveniently by a wrench.

JOSEPH F. WILHELM.

REFERENCES CITED

The following references are of record in the file of this patent:

UNITED STATES PATENTS

| Number | Name | Date |
|---|---|---|
| 2,255,310 | D'Arcey | Sept. 9, 1941 |
| 2,316,377 | Wilhelm | Apr. 13, 1943 |